Figure 1:
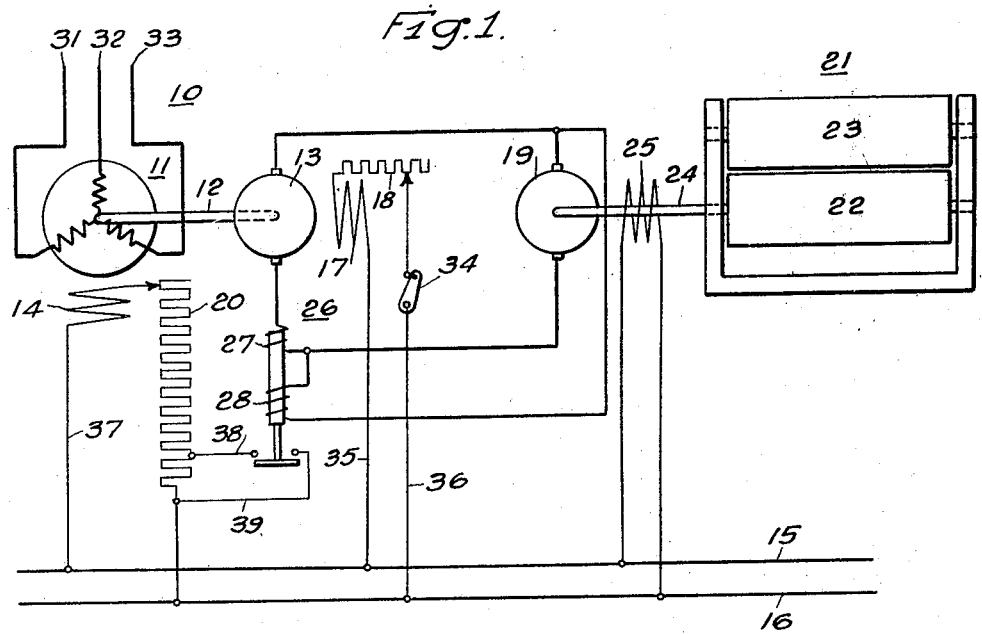

March 3, 1931.    O. NEEDHAM    1,794,977

CONTROL SYSTEM

Filed Nov. 23, 1927

INVENTOR
Ollie Needham.
BY
ATTORNEY

Patented Mar. 3, 1931

1,794,977

UNITED STATES PATENT OFFICE

OLLIE NEEDHAM, OF WILKINSBURG, PENNSYLVANIA, ASSIGNOR TO WESTINGHOUSE ELECTRIC & MANUFACTURING COMPANY, A CORPORATION OF PENNSYLVANIA

CONTROL SYSTEM

Application filed November 23, 1927. Serial No. 235,229.

This invention relates to motor control systems and more particularly to control systems for synchronous motors suitable to be utilized for operating rolling mills and similar machines.

In the operation of rolling mills, and especially blooming mills, it is desirable to provide a driving motor capable of operating for short intervals under heavy overloads such as occur when starting rolling operations. The usual practice is to either employ a synchronous motor direct-connected to the rolls of the mill, or to provide an adjustable speed direct-current motor to drive the rolls and utilize a synchronous motor-generator set for supplying power to the direct-current driving motor. To insure that the mill will be kept in continuous operation regardless of the overloading which may occur quite frequently, although existing only momentarily, a synchronous motor having sufficient pull-out or maximum torque must be provided. It is well known in the art that the pull-out or maximum torque of a synchronous motor may be materially increased by over-exciting the field. However, continuous over-excitation of the field is undesirable as it will result in over-heating and, consequently, burning out of the field winding. Furthermore, it is well known that over-excitation of a synchronous motor causes the motor to draw an excessive amount of leading current from the line which may be objectionable in many cases. The taking of a leading current alters the power-factor of the power system and usually results in the imposition of penalties on the mill owner. Therefore, it will be readily understood that in order to provide the required amount of maximum torque to keep the mill in operation during the high peak load periods, a motor must be provided which has a higher rating than that required for the normal mill load and results in a high installation cost.

In this invention, a synchronous motor of adequate rating for the normal load of the mill is utilized and in order to meet overload conditions provision is made for varying its field strength by a power relay in such a manner as to provide for over-excitation of the field whenever a peak load occurs, the excitation at all other times being controlled in the usual manner by a field rheostat so that the motor will not alter the power factor of the line excessively. Intermittent high values of exciting current although greatly in excess of the rated capacity of the field winding if only momentary will not cause damage.

It is, therefore, the object of the invention to provide a control system which shall be simple and inexpensive in construction, and reliable in operation.

Another object of the invention is to provide for controlling the excitation of a synchronous motor to increase its maximum or pull-out torque to meet peak load requirements.

A more specific object of the invention is to provide for automatically increasing the excitation of a synchronous motor when a peak load occurs and for decreasing the excitation when the peak load ceases to exist.

Another object of the invention is to provide for automatically decreasing the resistance of a synchronous motor field circuit when the motor is subjected to a load in excess of its over-load capacity, and for restoring the field circuit resistance to its proper value after the peak load has ceased to exist.

Figure 2:
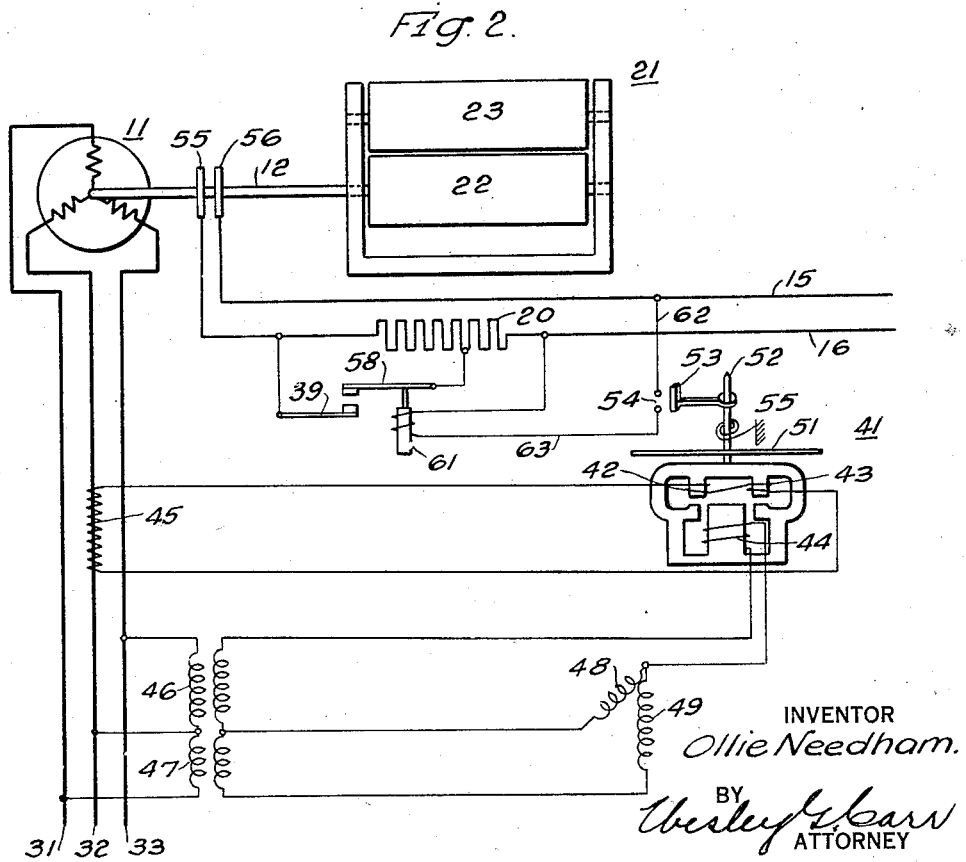

Other objects of the invention will become evident from the following description, taken in conjunction with the accompanying drawing, in which, Figure 1 is a diagrammatic view of a control system and apparatus connected in accordance with the invention, and, Fig. 2 is a diagrammatic view of a modified control system suitable for motors which are direct connected to the driven machines.

Referring now to Figure 1 of the drawing, 10 designates generally a motor-generator set comprising a synchronous motor 11, connected by means of a shaft 12 to a direct-current generator 13. In this instance, the synchronous motor 11 is provided with a field winding 14 which may be energized from any constant potential source of direct-current energy. In this instance the field winding 14 is shown connected to the positive and negative conductors 15 and 16 of a power line.

The direct-current generator 13 is also provided with a field winding 17 and its energization may be controlled by a variable resistor 18. As shown, the field and the resistor 18 are connected in series.

In this particular instance, the generator 13 is connected in series relation with a D. C. motor 19 which is disposed to drive a rolling mill indicated generally at 21.

In order to simplify the drawing, only two of the rolls of a rolling mill are illustrated. As shown, the lower roll 22 is directly connected to the motor 19 by means of a shaft 24 in the usual manner.

It is to be understood that the upper roll 23 is adjustable with respect to the lower roll 22. The relative adjustment of the rolls may be effected in any manner well known in the art, and therefore the adjusting mechanism is not illustrated.

As shown, the motor 19 is provided with a field winding 25 which is disposed to be energized from the constant potential source comprising line conductors 15 and 16.

In this particular embodiment of the invention, in order to momentarily increase the pull-out torque of the synchronous motor 11 when a peak load exists upon the driving motor 19, a D. C. power relay, shown generally at 26, is provided for controlling the excitation of the motor field winding 14. The power relay may be of any suitable type, and in this embodiment of the invention comprises a current coil 27 and voltage coil 28, the former being connected in the closed circuit of the generator 13 and motor 19 hereinbefore described, and the latter being connected in shunt relation to the motor 19.

In order to more clearly describe the operation of the power relay 26 in controlling the torque of the synchronous motor 11, the operation of the system will be set forth in detail.

In this instance the method of connecting the synchronous motor 11 to a suitable power source is of no importance, and starting means, being well known in the art, is not shown. However, it will be assumed that the stator leads 31, 32 and 33 are connected to a suitable source of polyphase power. The excitation of the synchronous motor 11 may be regulated by manipulation of the variable resistor 20, to cause the motor to operate at the desired power factor.

It will be noted that the field switch 34 of the generator field circuit is open and, consequently, there is no voltage being developed by the generator 13. Upon the closure of the field switch 34, an energizing circuit for the generator field is established and current flows from the positive conductor 15 through conductor 35, field winding 17, variable resistor 18, switch 34, and conductor 36 to the negative line conductor 16.

The voltage now developed by the generator 13 may be controlled by the variable resistor 18. The motor 19 being connected in a closed circuit with the generator 18 is energized from the generator and the mill 21 is set in operation.

When an ingot is caused to pass between the rolls 22 and 23, a heavy load is imposed upon the drive motor 19, which is transmitted to the synchronous motor 11. The load depends almost entirely upon the reduction that is to be made during a particular pass through the mill, and, as it is desirable to make the first few passes as effective as possible, it will be readily understood that the synchronous motor 11, having very small overload capacity, may be overloaded and, consequently, pull out of synchronism with the power source, which will result in a complete shut-down of the mill.

In order to prevent the stopping of the mill and also make it possible to utilize a synchronous motor of lower capacity than would otherwise be suitable, provision is made for varying the excitation of the field winding of the synchronous motor 11 to increase its load capacity.

In the event that the power demand upon the generator 13 is greatly increased, the current coil 27 and the voltage coil 28 of the relay 26 become energized and actuate the relay 26 to its closed position, short circuiting a portion of the field resistor 20. The exciting current of the synchronous motor 11 is instantly increased and flows through a circuit extending from the positive conductor 15, conductor 37, field winding 14, resistor 20, conductor 38, contact members of the power relay 26, and conductor 39 to the negative line conductor 16.

It will be readily understood that this increase of exciting current may be regulated so as to over-excite the synchronous motor 11 to any degree necessary to obtain the desired amount of maximum or pull-out torque. As the peak load exists only momentarily, the increased exciting current likewise will exist only momentarily and no damage to the field winding will result, even though the current carrying capacity of the field has been greatly exceeded.

Reference may now be had to the modification shown in Fig. 2, in which like reference numerals are employed to designate similar parts. In this instance, the synchronous motor 11 is connected directly to the rolling mill 21 through the shaft 12.

The same load conditions exist in this instance as hereinbefore set forth for the system shown in Fig. 1, and in order to increase the maximum or pull-out torque of the synchronous motor 11, in response to the peak load conditions which may exist, an alternating current power relay, designated generally at 41, is utilized.

The relay 41 may be of any suitable type and as shown comprises the usual current coils 42 and 43 and voltage coil 44, the former being disposed to be energized by a current transformer 45 which is connected in one of the energy supply lines of the motor 12. The voltage coil is connected in circuit with the secondary windings of a plurality of voltage transformers 46 and 47. A pair of reactance coils 48 and 49 are shown connected in the relay circuit in the usual manner.

The relay 41 is also provided with a rotating disc 51, supported by a vertical shaft 52 which carries the movable contact member 53 which is disposed to engage the fixed contact fingers 54 when the disc 51 is rotated. In accordance with the usual construction of a relay of this type, a coil spring 55 is provided which opposes the clockwise rotation of the disc 51 and maintains the movable contact member 53 in a disengaged position until the current and voltage coils become energized to the desired degree.

It will be observed that this particular embodiment of the invention differs from the former only in the manner in which the field circuit of the synchronous motor is controlled, the control means in the former being responsive to the power demanded by the direct current driving motor, whereas in this case, the A. C. power demanded by the synchronous motor is utilized to accomplish the same function.

The terminals of the field winding of the synchronous motor 11 are illustrated by the slip rings 55 and 56 which are shown mounted upon the shaft 12. The field circuit comprises the variable resistor 20, similar to that described hereinbefore in connection with Fig. 1.

As shown, a relay 58, having contact members 39 and an actuating coil 61 is disposed to short circuit a portion of the resistor 20.

Upon certain predetermined peak load demands on the synchronous motor 11, the power relay 41 is energized sufficiently to cause its operation, and therefore, move the movable contact member 53 into engagement with the fixed contact members 54 which establishes an operating circuit for the relay 58 which may be traced from the positive conductor 15, through conductor 62, relay contacts 54, conductor 63, coil 61, to the negative line conductor 16. Upon the closure of the relay 58, a portion of the field resistor 20 is short circuited and the exciting current for the synchronous motor 11 is instantly increased.

It will be noted that by means of the above described arrangement, that for operating many types of steel mills it is possible to utilize a synchronous motor which is exactly suited to the normal load impressed upon it by the mill and in addition, provide for increasing the maximum pull-out torque of the motor to such a degree that it will also be adequate for the extremely high peak load conditions which may arise from time to time.

Since certain changes may be made in the above described system and different embodiments of the invention may be made without departing from the scope thereof, it is intended that all the matter contained in the above description or shown in the accompanying drawings, shall be interpreted as illustrative and not in a limited sense.

I claim as my invention:

1. The combination with a direct-current motor, a motor-generator set for controlling the direct-current motor, said set comprising a synchronous motor and a direct-current generator, the direct-current generator and direct current motor being connected in a closed circuit, means for exciting the generator and the two motors, means for varying the excitation of the generator to vary the speed of the direct-current motor, the excitation means for the synchronous motor including means for varying the excitation in accordance with the normal load conditions of the synchronous motor, and means including a relay switch responsive to peak-load conditions of the direct-current motor for increasing in a one-step operation, the excitation of the synchronous motor beyond the value of excitation produced by the maximum continuous field current for normal load conditions during the periods of said peak loads, and reducing the excitation of said synchronous motor to its former value in accordance with normal load conditions during the remainder of the load cycle.

2. In a motor control system, in combination, a direct-current motor, a direct-current generator connected in a closed circuit with the motor, a synchronous motor for driving the direct-current generator, means for exciting the synchronous motor and the two direct-current machines, the excitation means for the synchronous motor including means for varying the degree of excitation for the normally rated load conditions of the synchronous motor, and switching means for quickly increasing, in abrupt steps, the degree of excitation of the synchronous motor to increase its torque, said means being responsive to predetermined peak load currents of the generator.

3. The combination with a direct-current motor, a motor-generator set for controlling the direct-current motor, said set comprising a synchronous motor and a direct-current generator, the direct-current generator and direct-current motor being connected in a closed circuit, means for exciting the generator and the two motors, a variable resistor for controlling the exciting current of the field winding, and a relay disposed to short-circuit a portion of said resistor to instantly increase the exciting current of the synchronous motor to a value above the normal capacity of the field winding, said relay being operable in response to a predetermined peak load of the direct-current motor.

4. The combination with a direct-current motor, a motor-generator set for energizing the motor, said motor-generator set comprising a direct-current generator and a synchronous driving motor, the direct-current generator being connected in a series circuit with the direct-current motor, a field winding for the synchronous motor, an exciting circuit for energizing said field winding, a variable resistor connected in the exciting circuit for controlling the current, a relay disposed to short circuit a portion of the resistor when actuated to the closed position, a relay actuating coil responsive to the generator voltage, a second relay actuating coil responsive to the direct-current flowing in the series circuit, said actuating coils being disposed for the cumulative action in the operation of the relay.

5. In a direct-current motor load application in which the load is of an intermittent character having extreme peaks in its energy requirements for brief periods, the combination, the said direct-current motor, a motor-generator set for controlling the direct-current motor, said motor-generator set comprising a synchronous motor and a direct-current generator, the direct-current generator being connected in a closed circuit with the direct-current motor, means for supplying exciting current to the generator and the two motors, means for controlling the direct-current generator exciting current to vary the speed of the direct-current motor, means for controlling the exciting current of the synchronous motor, said means including means for regulating the value of exciting current within the constant current carrying capacity of the field, and means responsive only to the brief-peak load conditions of the direct-current generator for increasing the value of the synchronous motor exciting current beyond the constant current carrying capacity of the field, to increase the maximum value of torque developed by the motor at the instant the peak-load condition exists, and for reducing the exciting current to the former constant value after the peak-load has passed.

6. In a power system, in combination, a synchronous motor provided with field and armature windings cooperative to develop a predetermined torque, a direct-current generator supplying a varying load, said generator being driven by the synchronous motor, and means responsive to a preselected load current and voltage of the generator when the motor is operating near full capacity, to increase instantly the excitation of the field windings, to temporarily increase the torque that may be delivered by the motor to a value in excess of said predetermined torque to meet peak load operating conditions.

7. In a power system for rolling mills, in combination, a synchronous motor provided with a field winding, means for effecting a transfer of power from the motor to the rolling mill, means for controlling the excitation of the motor field winding, said means comprising a resistor and a relay disposed to short circuit a portion of said resistor, said relay being responsive to the load imposed upon the motor when operating near its rated capacity, to increase the excitation of the field windings and thereby increase the maximum torque that may be developed by the motor.

8. In a power system for rolling mills, in combination, a synchronous motor provided with a field winding, means for effecting a transfer of power from the motor to the rolling mill, an energizing circuit for the field winding, a variable resistor connected in the energizing circuit for varying the field excitation to change the operating characteristics of the motor, a relay operable to shunt a preselected portion of the resistor, said relay being disposed to respond only upon the occurrence of a preselected load determined by the pull-out torque of the motor, to suddenly over excite the motor field during the periods in which unusual peak load conditions exist, thereby to raise the value of the normal pull-out torque of the motor.

9. The combination with a direct-current motor, a motor-generator set for operating said motor, said set including a synchronous motor and a direct-current generator, and a relay, responsive to a predetermined voltage and load-current of said direct-current generator, for increasing the exciting current of said synchronous motor.

10. In a power system in which the load is of an intermittent character having extreme peaks for brief periods of time, the combination of a direct-current motor, a motor-generator set for supplying power to the direct-current motor, said motor-generator set comprising a synchronous motor and a direct-current generator, and a relay, responsive to a predetermined voltage of the generator at peak-load conditions, for quickly increasing the synchronous-motor exciting current.

In testimony whereof, I have hereunto subscribed my name this 18th day of November, 1927.

OLLIE NEEDHAM.